US011323857B2

(12) United States Patent
Hosobuchi et al.

(10) Patent No.: US 11,323,857 B2
(45) Date of Patent: May 3, 2022

(54) COMMUNICATION METHOD AND COMMUNICATION SYSTEM

(71) Applicant: Murata Machinery, Ltd., Kyoto (JP)

(72) Inventors: Eiji Hosobuchi, Ise (JP); Tetsuya Kuwahara, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 186 days.

(21) Appl. No.: 16/753,830

(22) PCT Filed: Oct. 5, 2018

(86) PCT No.: PCT/JP2018/037385
§ 371 (c)(1),
(2) Date: Apr. 6, 2020

(87) PCT Pub. No.: WO2019/073928
PCT Pub. Date: Apr. 18, 2019

(65) Prior Publication Data
US 2020/0288285 A1  Sep. 10, 2020

(30) Foreign Application Priority Data
Oct. 10, 2017 (JP) .............................. JP2017-196487

(51) Int. Cl.
*H04W 4/00* (2018.01)
*H04W 4/38* (2018.01)
(Continued)

(52) U.S. Cl.
CPC .............. *H04W 4/38* (2018.02); *H04W 84/20* (2013.01); *H04W 88/04* (2013.01)

(58) Field of Classification Search
CPC ........... H04W 4/38; H04W 4/40; H04W 4/02; H04W 4/80; H04W 84/20; H04W 88/04
See application file for complete search history.

(56) References Cited

U.S. PATENT DOCUMENTS

2008/0143512 A1   6/2008  Wakisaka et al.
2013/0094599 A1*  4/2013  Itoigawa ................. H04B 3/52
                                                                   375/259
(Continued)

FOREIGN PATENT DOCUMENTS

JP          09-23279 A      1/1997
JP       2007-150509 A      6/2007
(Continued)

OTHER PUBLICATIONS

English Translation of the International Preliminary Report on Patentability dated Apr. 16, 2020, of corresponding PCT Application No. PCT/JP2018/037385.

*Primary Examiner* — Abdelillah Elmejjarmi
(74) *Attorney, Agent, or Firm* — DLA Piper LLP (US)

(57) ABSTRACT

A communication method includes: switching an operation mode of a first station from a first operation mode to a second operation mode; transmitting a first signal from the first station to a second station; transmitting data from the second station to the first station in response to the first signal; storing the data received by the first station from the second station into a storage of the first station; switching the operation mode of the first station from the second operation mode to the first operation mode; transmitting a second signal from an access point to the first station; and transmitting the data stored into the storage from the first station operating in the first operation mode to the access point in response to the second signal.

6 Claims, 13 Drawing Sheets

(51) Int. Cl.
*H04W 84/20* (2009.01)
*H04W 88/04* (2009.01)

(56) References Cited

U.S. PATENT DOCUMENTS

| | | |
|---|---|---|
| 2013/0235732 A1 | 9/2013 | Nema |
| 2015/0269107 A1 | 9/2015 | Tanimoto et al. |
| 2016/0345920 A1* | 12/2016 | Tajima ................. A61B 6/5294 |
| 2018/0338290 A1 | 11/2018 | Tashiro et al. |
| 2019/0302267 A1* | 10/2019 | Morita ............... G06K 9/00201 |

FOREIGN PATENT DOCUMENTS

| | | |
|---|---|---|
| JP | 2007-288312 A | 11/2007 |
| JP | 2010-183215 A | 8/2010 |
| JP | 2012-060771 A | 3/2012 |
| JP | 2012-156895 A | 8/2012 |
| JP | 2013-187615 A | 9/2013 |
| JP | 2017-139520 A | 8/2017 |
| WO | 2014/069029 A1 | 5/2014 |

* cited by examiner

FIG. 5

| Position information of ST | MAC address of ST | Radio field strength between ST and AP | Temperature data 1 | Temperature data 2 | Temperature data 3 | Temperature data 4 | Date and time of obtainment |
|---|---|---|---|---|---|---|---|
| 0001 | xx:xx:xx:xx:xx:01 | -60 | 62 | 62 | 62 | 62 | 2017/3/17 10:00 30 |
| 0002 | xx:xx:xx:xx:xx:02 | -65 | 60 | 60 | 60 | 60 | 2017/3/17 10:00 31 |

FIG. 12

| PLCP preamble | PLCP header | IEEE802.11 header | Frame Body | FCS |

| | | IP header | UDP header | Response data |

| IP header | Src IP address | 4 byte | yy.yy.yy.yy |
|---|---|---|---|
| | Dest IP address | 4 byte | zz.zz.zz.zz |
| Response data | Command type | 1 byte | 0x81 |
| | Data length | 1 byte | 20 |
| | Position information | 2 byte | 0001 |
| | Radio field strength | 1 byte | 70 |
| | Position information of second station | 2 byte | 0002 |
| | MAC address of second station | 6 byte | xx:xx:xx:xx:xx:02 |
| | Temporary IP address of second station | 4 byte | ww:ww:ww:ww |
| | Radio field strength of second station | 1 byte | 60 |
| | Temperature data 1-4 of second station | 4 byte | 60 |

COMMUNICATION METHOD AND COMMUNICATION SYSTEM

TECHNICAL FIELD

This disclosure relates to communication methods and systems for performing communication using a wireless network.

BACKGROUND

For example, transport vehicles that travel along rails are used in automated warehouses and the like to transfer articles. Power receiving units that receive electricity contactlessly using an electromagnetic induction phenomenon from power supply lines installed along the rails are mounted on the transport vehicles. The transport vehicles travel along the rails while receiving electricity from the power supply lines via the power receiving units.

Large electric current flows through the power supply lines and thus, there are instances where a terminal block disposed at a joint portion between the power supply lines may produce heat and become very hot. Therefore, a sensor device including a temperature sensor that senses the temperature of the terminal block is disposed on the terminal block.

Furthermore, for example, automated warehouses and the like include a communication system in which an access point and the sensor device serving as a station are connected to a wireless network. Upon obtaining temperature data from the sensor device, the access point transmits command data to the sensor device. This causes the sensor device to transmit the temperature data to the access point on the basis of the command data from the access point. This is disclosed in Japanese Unexamined Patent Application Publication No. 2007-150509.

For example, there are instances where the communication between the access point and the sensor device may not be in good condition due to an obstacle between the access point and the sensor device. Hence, the sensor device cannot receive the command data from the access point. This results in the problem of the access point failing to obtain the temperature data from the sensor device.

It could therefore be helpful to provide a communication method and a communication system in which an access point can reliably obtain data from a second station.

SUMMARY

We thus provide:

A communication method is used in a communication system including an access point, a first station, and a second station each of which is connected to a wireless network. The communication method includes: (a) switching an operation mode of the first station from a first operation mode in which the first station operates as a slave station to a second operation mode in which the first station operates as a proxy master station; (b) transmitting, from the first station operating in the second operation mode to the second station, a first signal for requesting transmission of data held by the second station; (c) transmitting the data from the second station to the first station in response to the first signal; (d) storing the data received by the first station from the second station into a storage of the first station; (e) switching the operation mode of the first station from the second operation mode to the first operation mode after the first station receives the data from the second station; (f) transmitting, from the access point to the first station, a second signal for requesting transmission of the data, after the data is stored into the storage of the first station; and (g) transmitting, from the first station operating in the first operation mode to the access point, the data stored into the storage, in response to the second signal.

The first station can operate as a proxy master station to obtain, from the second station, data held by the second station. Thus, for example, even when the communication between the access point and the second station is not in good condition, the access point can reliably obtain the data from the second station via the first station. Furthermore, since the data transmitted from the second station is stored into the storage of the first station, the first station can transmit the data stored into the storage to the access point at the time of transmission of the second signal from the access point to the first station. This allows the access point to obtain the data from the second station at any desired time. There is no limitation on the sequence of steps the sequence of which is not specified among the abovementioned steps (a) to (g). This also applies to the steps described later.

For example, the communication method may further include: (h) transmitting, from the access point to the first station, a third signal for instructing the first station to switch from the first operation mode to the second operation mode, depending on a state of communication between the access point and the second station. In (a), the operation mode of the first station may be switched from the first operation mode to the second operation mode in response to the third signal.

The first station can switch the operation mode from the first operation mode to the second operation mode depending on the state of communication between the access point and the second station.

For example, the communication method may further include: (i) determining whether a radio field strength in the communication between the access point and the second station is less than or equal to a threshold value. In (h), when the radio field strength is determined to be less than or equal to the threshold value, the access point may transmit the third signal to the first station.

The first station can switch the operation mode from the first operation mode to the second operation mode when the radio field strength in the communication between the access point and the second station is less than or equal to the threshold value.

For example, the second station may include a sensor, and the data may include data detected by the sensor in the second station.

The second station can be used as a sensor station.

For example, the sensor may include at least one sensor that is any of a temperature sensor, a moisture sensor, an infrared sensor, a mechanical sensor, an electric current sensor, and a flow sensor.

The second station can be used as various sensor stations such as a temperature sensor.

Furthermore, a communication method can include: an access point connected to a wireless network; a first station connected to the wireless network; and a second station connected to the wireless network. The first station can include: a controller which switches an operation mode of the first station between a first operation mode in which the first station operates as a slave station and a second operation mode in which the first station operates as a proxy master station; a first communicator which, when the operation mode of the first station is switched from the first operation mode to the second operation mode, transmits a first signal for requesting transmission of data held by the second station to the second station; and a storage which stores the data transmitted from the second station. The second station can include: a second communicator which transmits the data to the first station in response to the first signal transmitted from the first station. The access point can include: a third communicator which transmits a second signal for requesting transmission of the data to the first station after the data is stored into the storage of the first station. After the operation mode of the first station is switched from the second operation mode to the first operation mode, the first communicator of the first station transmits the data stored into the storage to the access point in response to the second signal transmitted from the access point.

The first station can operate as a proxy master station to obtain, from the second station, data held by the second station. Thus, for example, even when the communication between the access point and the second station is not in good condition, the access point can reliably obtain the data from the second station via the first station. Furthermore, since the data transmitted from the second station is stored into the storage of the first station, the first station can transmit the data stored into the storage to the access point at the time of transmission of the second signal from the access point to the first station. This allows the access point to obtain the data from the second station at any desired time.

With our communication method, the access point can reliably obtain data from the second station.

BRIEF DESCRIPTION OF THE DRAWINGS

FIG. 5 is a diagram illustrating one example of a management table.

FIG. 12 is a diagram illustrating one example of response data transmitted from a first station to an access point.

Figure 1:
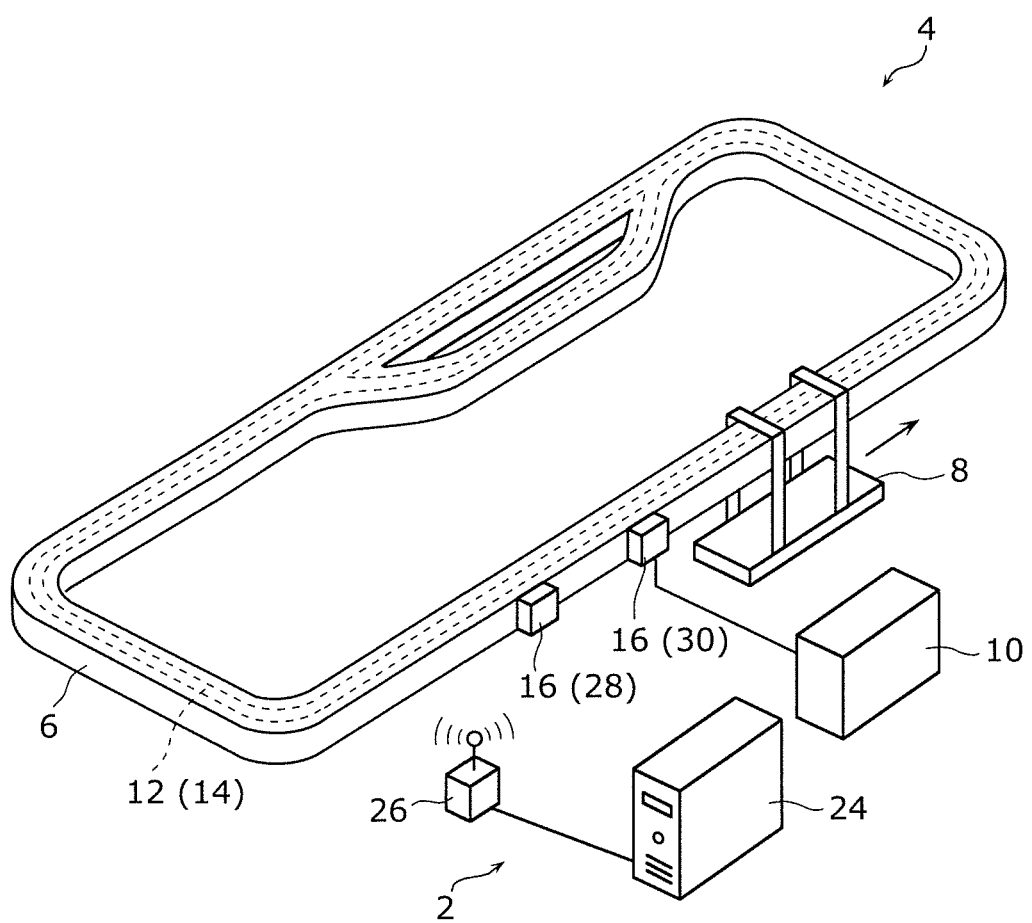
FIG. 1 is a diagram illustrating the configuration of a transport vehicle system which is an example of application of a communication system.

REFERENCE SIGNS LIST 2, 2A communication system
4 transport vehicle system
6 rail
8 transport vehicle
10 power supply device
12 power supply path
14 power supply line
16 terminal box
18 terminal block
20a first temperature sensor
20b second temperature sensor
20c third temperature sensor
20d fourth temperature sensor
22 detection board
24 management device
26 access point
28, 28A first station
30, 30A second station
32 wireless network
34, 38, 42, 48 communicator
36, 40, 44, 50 storage
37, 41, 46, 52 controller
54 obstacle

DETAILED DESCRIPTION

Hereinafter, an example will be described in detail with reference to the drawings. Each configuration described below shows a general or specific example. The numerical values, shapes, materials, structural elements, and the arrangement and connection of the structural elements, steps and the processing order of the steps shown in the following configuration are mere examples, and are not intended to limit this disclosure. Among the structural elements in the following example, structural elements not recited in any one of the independent claims will be described as arbitrary structural elements.

1. Configuration of Transport Vehicle System

Figure 2:
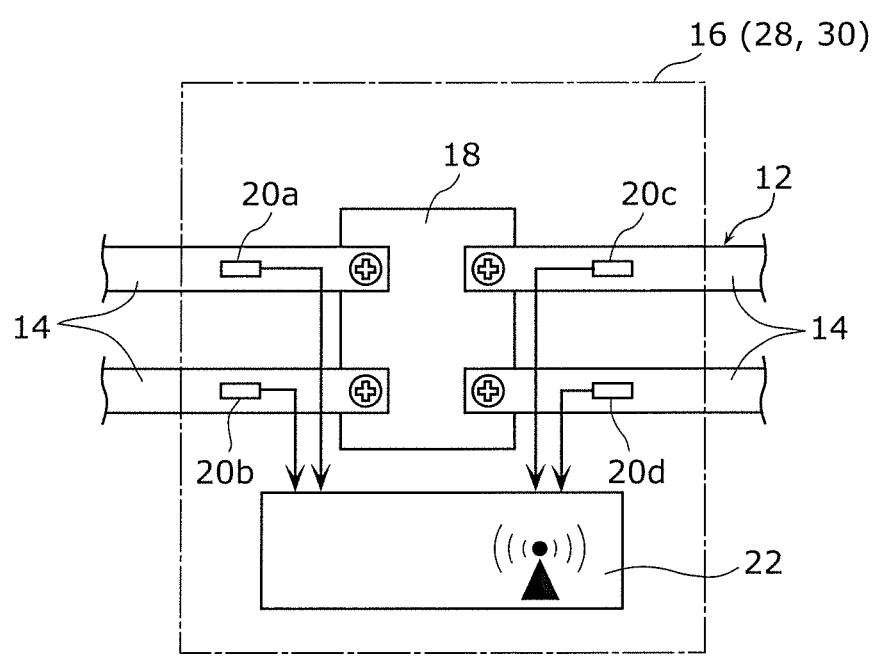
FIG. 2 is a diagram illustrating the internal configuration of a terminal box illustrated in FIG. 1.

First, with reference to FIGS. 1 and 2, the configuration of transport vehicle system 4 which is an example of application of communication system 2 will be described. FIG. 1 is a diagram illustrating the configuration of transport vehicle system 4 which is an example of application of communication system 2. FIG. 2 is a diagram illustrating the internal configuration of terminal box 16 illustrated in FIG. 1.

As illustrated in FIG. 1, transport vehicle system 4 is used, for example, in an automated warehouse or the like to transfer an article using transport vehicle 8 which travels along rail 6 installed on the ceiling.

Rail 6 is installed, for example, suspended from the ceiling of the automated warehouse or the like. Transport vehicle 8 can contactlessly receive, using an electromagnetic induction phenomenon, electricity supplied from power supply device 10 through power supply path 12 installed along rail 6. Thus, transport vehicle 8 is capable of traveling along rail 6 while receiving electricity from power supply path 12.

As illustrated in FIG. 2, power supply path 12 includes a pair of power supply lines 14 having a plurality of joint portions. As illustrated in FIGS. 1 and 2, terminal box 16 is disposed at each of the plurality of joint portions. Terminal block 18, first temperature sensor 20a, second temperature sensor 20b, third temperature sensor 20c, fourth temperature sensor 20d, and detection board 22 are arranged inside terminal box 16. Although only two terminal boxes 16 are illustrated in FIG. 1 for the sake of simplicity, three or more (for example, 100) terminal boxes 16 may be disposed.

Terminal block 18 electrically connects the joint portions between the pair of power supply lines 14 to each other. First to fourth temperature sensors 20a to 20d respectively detect the temperatures of four power supply lines 14 electrically connected to terminal block 18 and generate temperature data (one example of the data) indicating the detected temperatures. Detection board 22 obtains the respective temperature data from the first to fourth temperature sensors 20a to 20d. Furthermore, detection board 22 has a wireless communication function for wirelessly transmitting and receiving the temperature data and the like.

2. Configuration of Communication System

Figure 3:
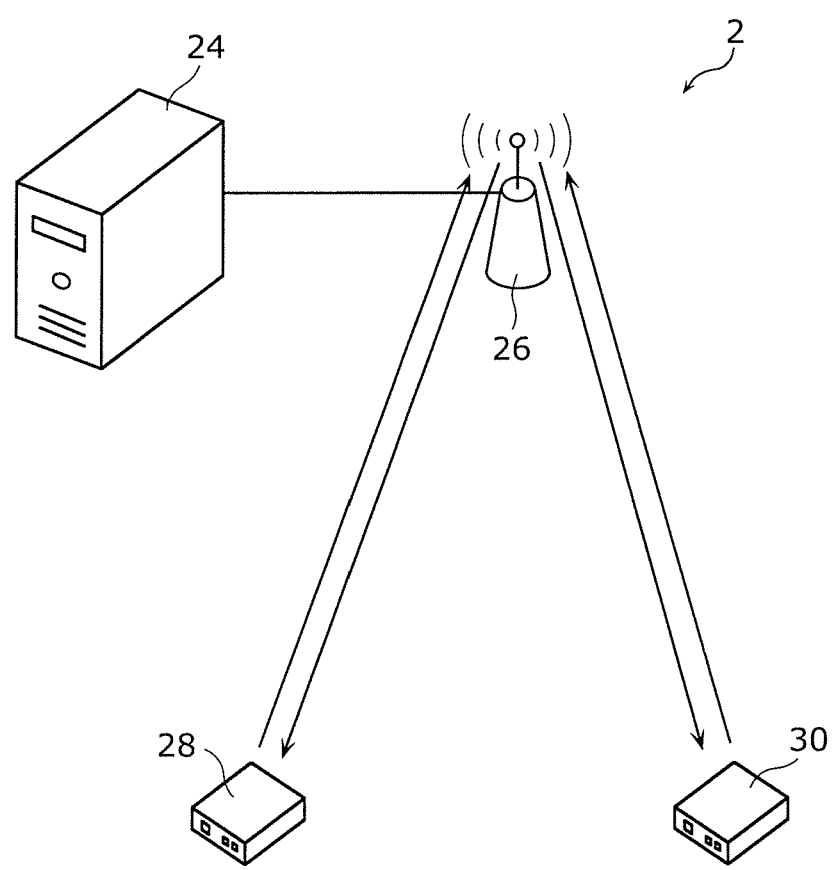
FIG. 3 is a conceptual diagram illustrating the configuration of a communication system according to an example.
Figure 4:
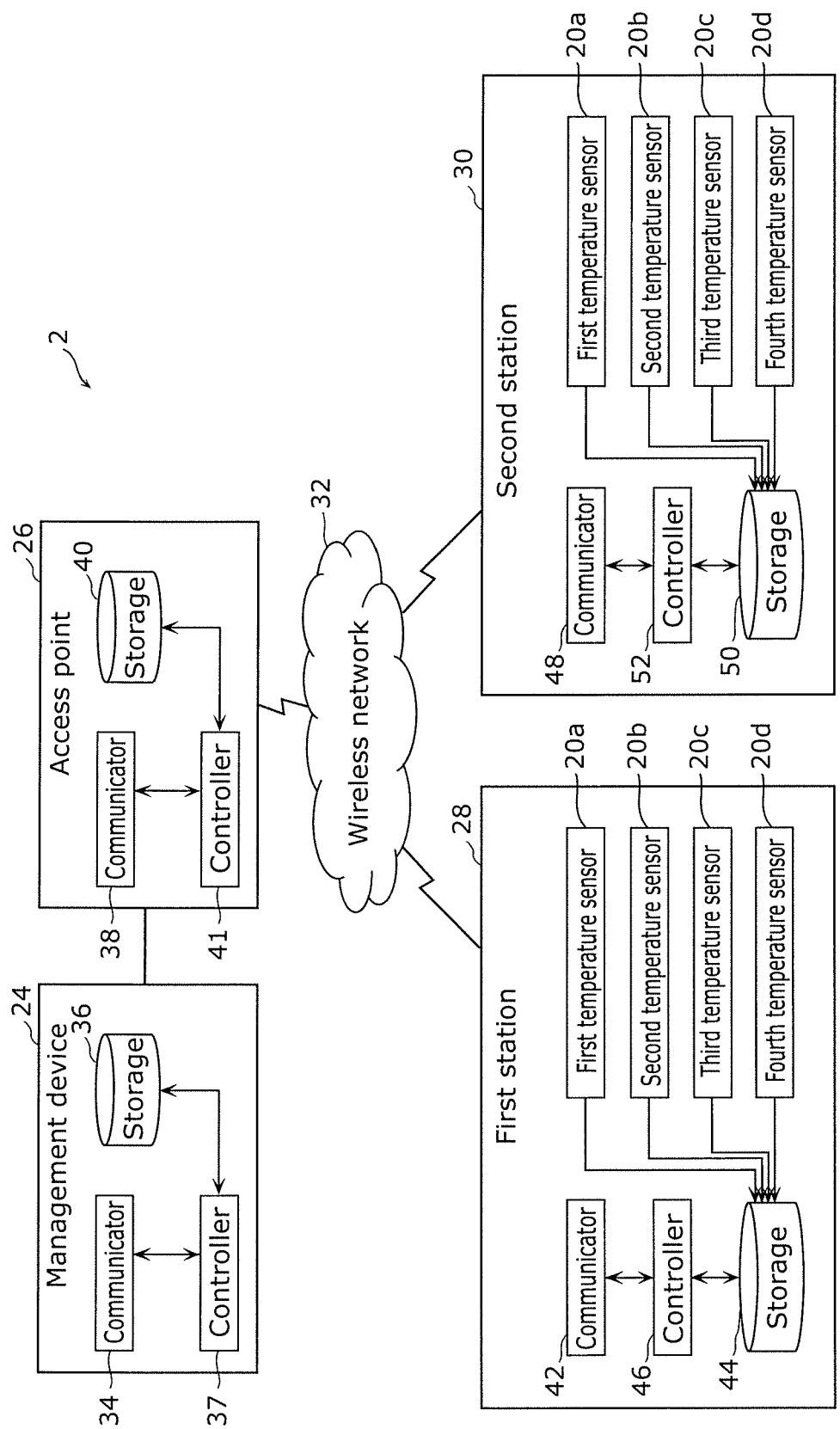
FIG. 4 is a block diagram illustrating the configuration of a communication system according to an example.

Next, the configuration of communication system 2 will be described with reference to FIGS. 1 and 3 to 5. FIG. 3 is a conceptual diagram illustrating the configuration of communication system 2 according to the example. FIG. 4 is a block diagram illustrating the configuration of communication system 2. FIG. 5 is a diagram illustrating one example of the management table.

As illustrated in FIGS. 1, 3, and 4, communication system 2 includes management device 24, access point 26, first station 28, and second station 30. Access point 26, first station 28, and second station 30 are connected by wireless network 32 compliant with, for example, the IEEE 802.11 series. Wireless network 32 is built, for example, using the WiFi (registered trademark) in the 2.4 GHz or 5 GHz band. Furthermore, management device 24 and access point 26 are connected to a wired network built, for example, by a wired local area network (LAN) using a cable. Although this example describes when communication system 2 includes two stations (first station 28 and second station 30) for the sake of simplicity, communication system 2 may include three or more stations.

Management device 24 is a computer that manages access point 26, first station 28, and second station 30 and monitors the respective temperature data obtained from first to fourth temperature sensors 20a to 20d in each terminal box 16. As illustrated in FIG. 4, management device 24 includes communicator 34, storage 36, and controller 37. Communicator 34 performs wired communication with access point 26. Storage 36 stores, for example, a management table for managing the temperature data and the like obtained from each of first station 28 and second station 30.

The management table is, for example, a data table such as that illustrated in FIG. 5. Data about first station 28 is stored in the first row of the management table. Specifically, in the first row of the management table, a) position information "0001" indicating the position of first station 28, b) the media access control (MAC) address "xx:xx:xx:xx:xx:01" of first station 28, c) the radio field strength "−60 (dbm)" between access point 26 and first station 28, d) respective temperature data 1 to 4 "62 (° C.)" obtained from first to fourth temperature sensors 20a to 20d in first station 28, and e) the date and time "2017/3/17 10:00 30" when the temperature data is obtained are stored.

Furthermore, data about second station 30 is stored in the second row of the management table. Specifically, in the second row of the management table, a) position information "0002" indicating the position of second station 30, b) MAC address "xx:xx:xx:xx:xx:02" of second station 30, c) the radio field strength "−65 (dbm)" between access point 26 and second station 30, d) respective temperature data 1 to 4 "60 (° C.)" obtained from first to fourth temperature sensors 20a to 20d in second station 30, and e) the date and time "2017/3/17 10:00 31" when the temperature data is obtained are stored.

In the management table illustrated in FIG. 5, the radio field strength is a value of 0 dbm to −99 dbm, and the temperature data 1 to 4 is a value of 0° C. to 100° C. For illustrative purposes, FIG. 5 shows the example where the management table includes data about two stations (first station 28 and second station 30), but, when communication system 2 includes three or more stations, the management table may include data about the three or more stations.

Controller 37 manages the management table stored into storage 36. Furthermore, on the basis of the management table stored into storage 36, controller 37 generates various command data to be transmitted to access point 26. Moreover, upon an attempt to transmit command data to first station 28 or second station 30, when response data is returned from first station 28 or second station 30, controller 37 determines that communication is possible, and when no response data is returned from first station 28 or second station 30, controller 37 determines that communication is not possible. In this manner, controller 37 determines the state of communication between access point 26 and each of first station 28 and second station 30.

Access point 26 functions as an access point (AP) in a wireless LAN. As illustrated in FIG. 4, access point 26 includes communicator 38 (one example of the third communicator), storage 40, and controller 41. Communicator 38 performs wired communication with management device 24 and performs wireless communication with each of first station 28 and second station 30. Storage 40 stores the temperature data and the like obtained from each of first station 28 and second station 30. Controller 41 generates, for example, various command data to be transmitted to each of first station 28 and second station 30 and various response data to be transmitted to management device 24.

First station 28 called a sensor device functions as a station (ST) in the wireless LAN. Specifically, first station 28 is terminal box 16 in transport vehicle system 4 illustrated in FIG. 1. As illustrated in FIG. 4, first station 28 includes communicator 42 (one example of the first communicator), first to fourth temperature sensors 20a to 20d, storage 44, and controller 46. Communicator 42 performs wireless communication with access point 26 and second station 30. Each of first to fourth temperature sensors 20a to 20d generates temperature data, as described above. Storage 44 stores the temperature data and the like obtained from each of first to fourth temperature sensors 20a to 20d in first station 28. Controller 46 generates, for example, various command data to be transmitted to second station 30 and various response data to be transmitted to access point 26. Furthermore, controller 46 switches the operation mode of first station 28 between a first operation mode in which first station 28 operates as a station (one example of the slave station) and a second operation mode in which first station 28 operates as a proxy access point (one example of the proxy master station).

Second station 30 called a sensor device functions as a station in the wireless LAN. Specifically, similar to first station 28, second station 30 is terminal box 16 in transport vehicle system 4 illustrated in FIG. 1. As illustrated in FIG. 4, second station 30 includes communicator 48 (one example of the second communicator), first to fourth temperature sensors 20a to 20d, storage 50, and controller 52. Communicator 48 performs wireless communication with access point 26 and first station 28. Each of first to fourth temperature sensors 20a to 20d generates temperature data, as described above. Storage 50 stores the temperature data and the like obtained from each of first to fourth temperature sensors 20a to 20d in second station 30. Controller 52 generates, for example, various command data to be transmitted to first station 28 and various response data to be transmitted to access point 26. Furthermore, controller 52 switches the operation mode of second station 30 between a first operation mode in which second station 30 operates as a station and a second operation mode in which second station 30 operates as a proxy access point.

3. Operation of Communication System 3-1. Operation Example 1

With reference to FIGS. 3 and 6 to 8, the following describes the operation of communication system 2 according to the example when the communication between access point 26 and each of first station 28 and second station 30 is in good condition.

Figure 6:
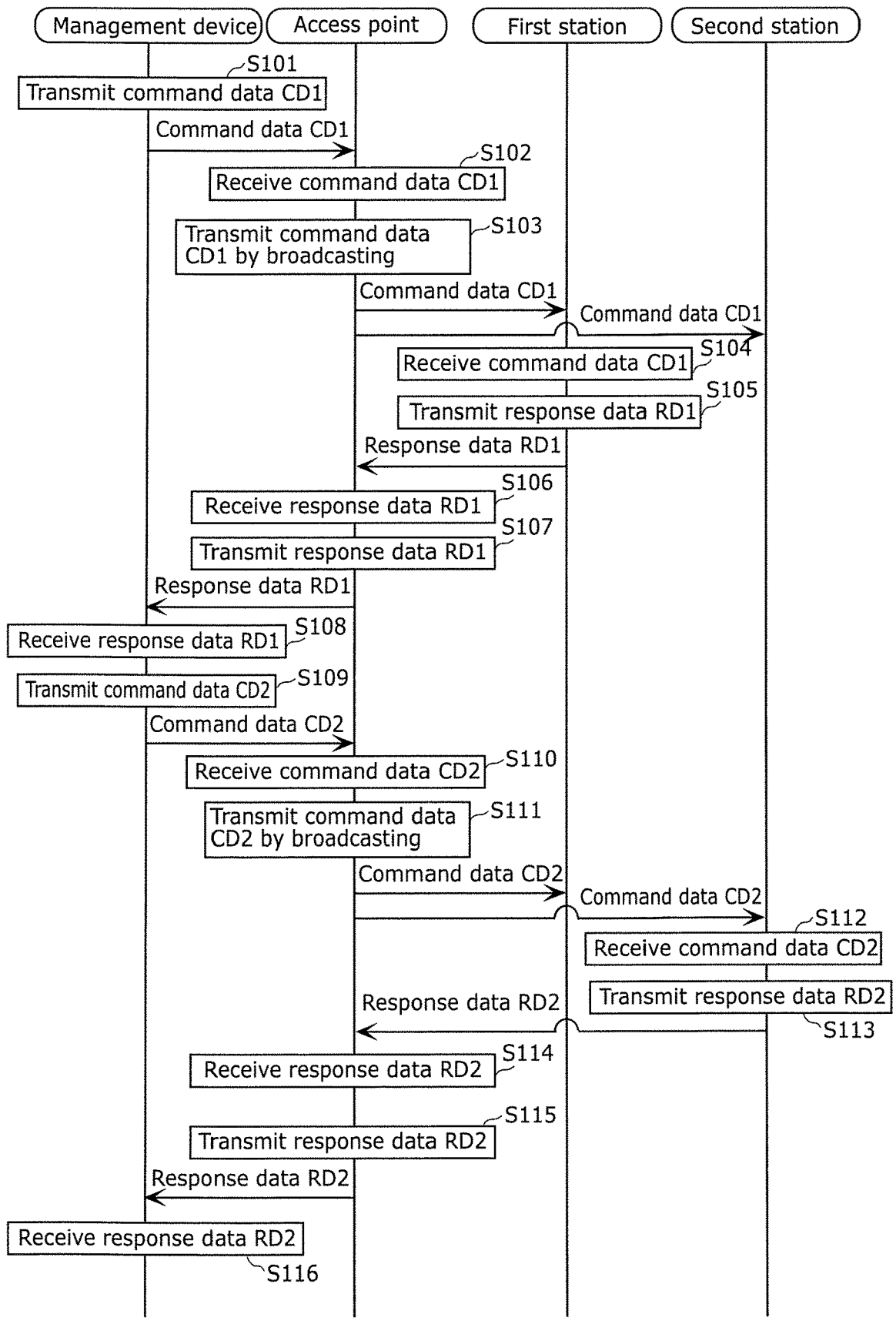
FIG. 6 is a sequence diagram illustrating the operation of a communication system according to an example when the communication between an access point and each of a first station and a second station is in good condition.
Figure 7:
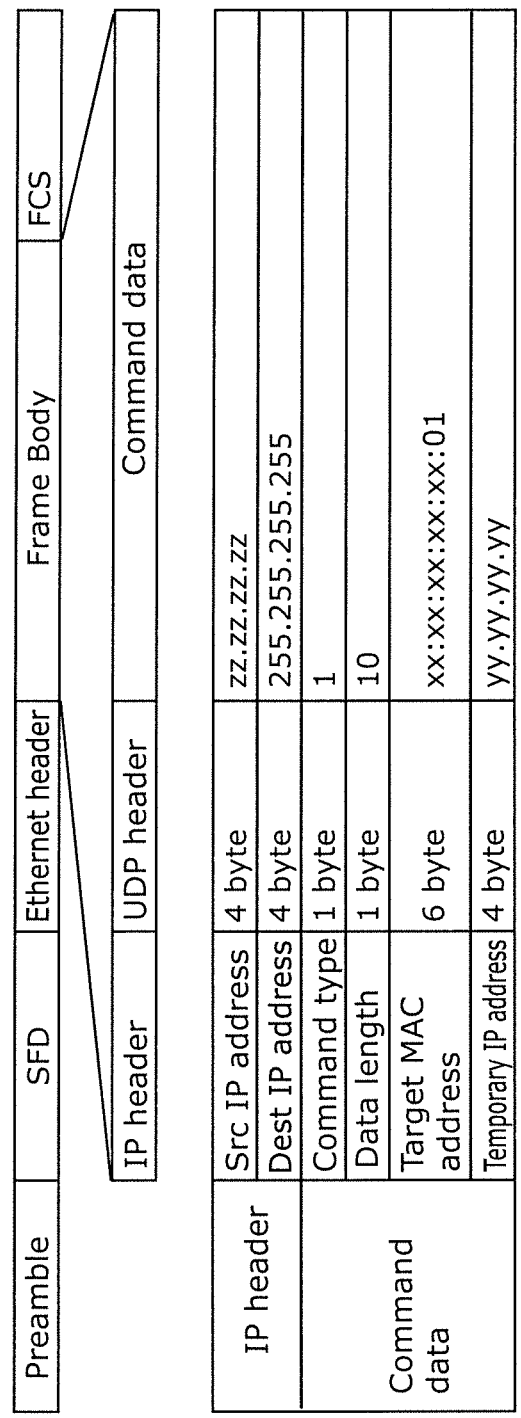
FIG. 7 is a diagram illustrating one example of command data transmitted from a management device to an access point.
Figure 8:
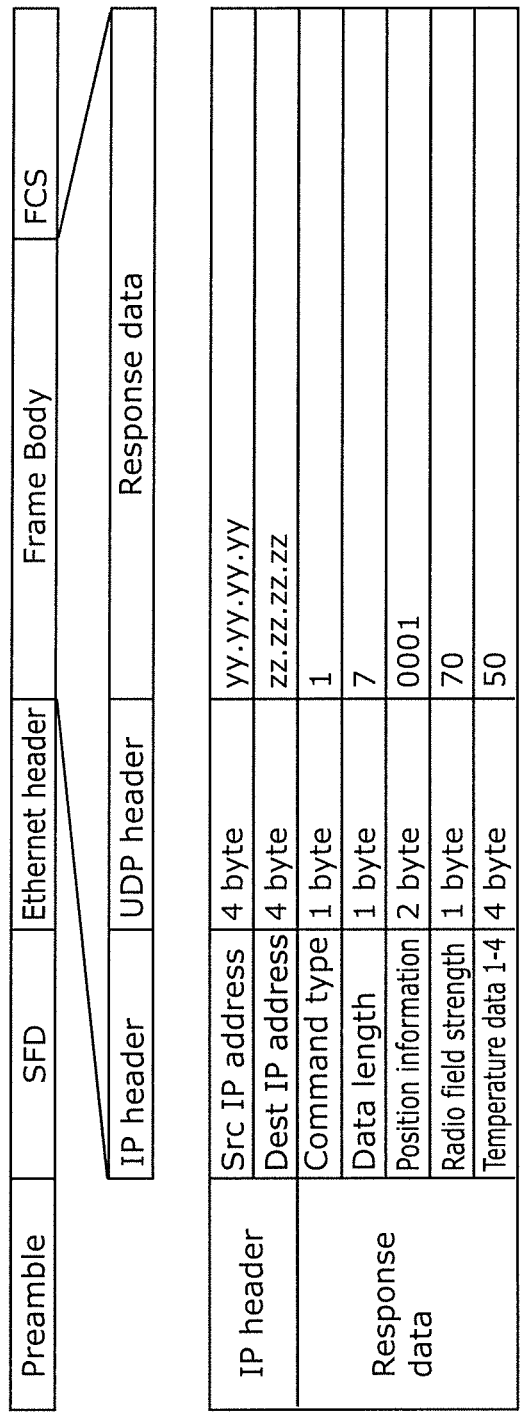
FIG. 8 is a diagram illustrating one example of response data transmitted from a first station to an access point.

FIG. 6 is a sequence diagram illustrating the operation of communication system 2 according to the example when the communication between access point 26 and each of first station 28 and second station 30 is in good condition. FIG. 7 is a diagram illustrating one example of command data CD1 transmitted from management device 24 to access point 26. FIG. 8 is a diagram illustrating one example of response data RD1 transmitted from first station 28 to access point 26.

In the state illustrated in FIG. 3, since there is no obstacle, access point 26 and each of first station 28 and second station 30 satisfactorily communicate with each other. In the operation example illustrated in FIG. 6, the operation mode of each of first station 28 and second station 30 is maintained to be the first operation mode, and first station 28 and second station 30 do not communicate with each other.

Controller 37 of management device 24 determines that the communication between access point 26 and first station 28 is possible and generates command data CD1. Command data CD1 is for requesting first station 28 to transmit the temperature data generated by each of first to fourth temperature sensors 20a to 20d in first station 28. In the example illustrated in FIG. 7, command data CD1 includes a) the source internet protocol (IP) address of command data CD1, that is, IP address "zz.zz.zz.zz" of management device 24, b) the destination IP address of command data CD1, that is, IP address "255.255.255.255" of broadcasting, c) command type "1," d) data length "10," e) the destination of command data CD1, that is, MAC address "xx:xx:xx:xx:xx:01" of first station 28, and f) temporary IP address "yy.yy.yy.yy" temporarily allocated by management device 24 to first station 28.

As illustrated in FIG. 6, communicator 34 of management device 24 transmits command data CD1 to access point 26 (S101). Communicator 38 of access point 26 receives command data CD1 transmitted from management device 24 (S102).

Communicator 38 of access point 26 transmits received command data CD1 by broadcasting (S103). Communicator 42 of first station 28 receives, as command data directed to itself, command data CD1 transmitted from access point 26 because the MAC address included in command data CD1 matches the own MAC address (S104). Communicator 48 of second station 30 does not receive command data CD1 transmitted from access point 26 because the MAC address included in command data CD1 does not match the own MAC address.

Controller 46 of first station 28 generates response data RD1 on the basis of received command data CD1. Response data RD1 is for responding to access point 26 with, for example, the temperature data generated by each of first to fourth temperature sensors 20a to 20d in first station 28. In the example illustrated in FIG. 8, response data RD1 includes a) the source IP address of response data RD1, that is, temporary IP address "yy.yy.yy.yy" of first station 28, b) the destination IP address of response data RD1, that is, IP address "zz.zz.zz.zz" of management device 24, c) command type "1," d) data length "7," e) position information "0001" indicating the position of first station 28, f) radio field strength "70 (−70 dbm)" between access point 26 and first station 28, and g) temperature data "50 (° C.)" generated by each of first to fourth temperature sensors 20a to 20d in first station 28.

Communicator 42 of first station 28 transmits response data RD1 to access point 26 using, as the own IP address, temporary IP address "yy.yy.yy.yy" included in command data CD1 (S105). Communicator 38 of access point 26 receives response data RD1 transmitted from first station 28 (S106).

Communicator 38 of access point 26 transmits, to management device 24 (S107), response data RD1 that has been received. Communicator 34 of management device 24 receives response data RD1 transmitted from access point 26 (S108). Accordingly, on the basis of received response data RD1, controller 37 of management device 24 updates the data about first station 28 in the management table stored into storage 36.

Subsequently, controller 37 of management device 24 determines that the communication between access point 26 and second station 30 is possible and generates command data CD2. Command data CD2 is for requesting second station 30 to transmit the temperature data generated by each of first to fourth temperature sensors 20a to 20d in second station 30. Command data CD2 is equivalent to the result obtained by replacing the MAC address of command data CD1 illustrated in FIG. 7 by MAC address "xx:xx:xx:xx:xx:02" of second station 30, for example.

As illustrated in FIG. 6, communicator 34 of management device 24 transmits, to access point 26, command data CD2 generated by controller 37 (S109). Communicator 38 of access point 26 receives command data CD2 transmitted from management device 24 (S110).

Communicator 38 of access point 26 transmits received command data CD2 by broadcasting (S111). Communicator 48 of second station 30 receives, as command data directed to itself, command data CD2 transmitted from access point 26 because the MAC address included in command data CD2 matches the own MAC address (S112). Communicator 42 of first station 28 does not receive command data CD2 transmitted from access point 26 because the MAC address included in command data CD2 does not match the own MAC address.

Controller 52 of second station 30 generates response data RD2 on the basis of received command data CD2. Response data RD2 is for responding to access point 26 with, for example, the temperature data generated by each of first to fourth temperature sensors 20a to 20d in second station 30. Response data RD2 is equivalent to the result obtained by replacing, in response data RD1 illustrated in FIG. 8, for example, a) the position information by position information "0002" indicating the position of second station 30, b) the radio field strength by radio field strength "60 (−60 dbm)" between access point 26 and second station 30, and c) the temperature data by temperature data "60 (° C.)" generated by each of first to fourth temperature sensors 20a to 20d in second station 30.

Communicator 48 of second station 30 transmits response data RD2 to access point 26 using, as the own IP address, temporary IP address "yy.yy.yy.yy" included in command data CD2 (S113). Communicator 38 of access point 26 receives response data RD2 transmitted from second station 30 (S114).

Communicator 38 of access point 26 transmits, to management device 24, response data RD2 that has been received (S115). Communicator 34 of management device 24 receives response data RD2 transmitted from access point 26 (S116). Accordingly, on the basis of received response data RD2, controller 37 of management device 24 updates the data about second station 30 in the management table stored into storage 36.

3-2. Operation Example 2

With reference to FIG. 9 to FIG. 12, the following describes the operation of communication system 2 according to the example when the communication between access point 26 and second station 30 is not in good condition.

Figure 9:
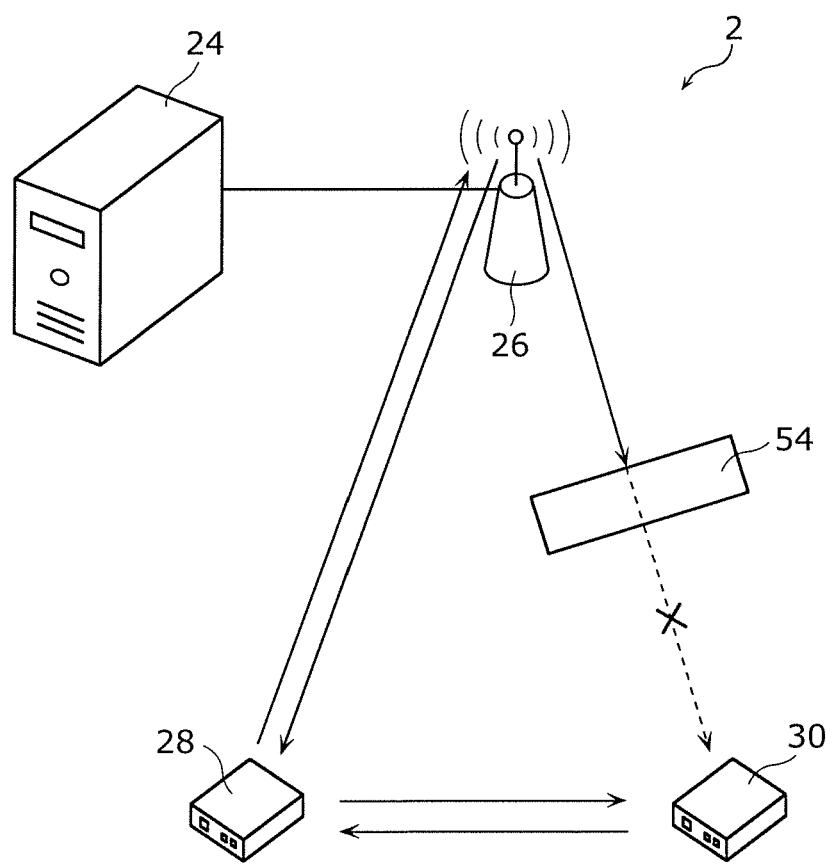
FIG. 9 is a conceptual diagram illustrating the configuration of a communication system according to an example when the communication between an access point and a second station is not in good condition.
Figure 10:
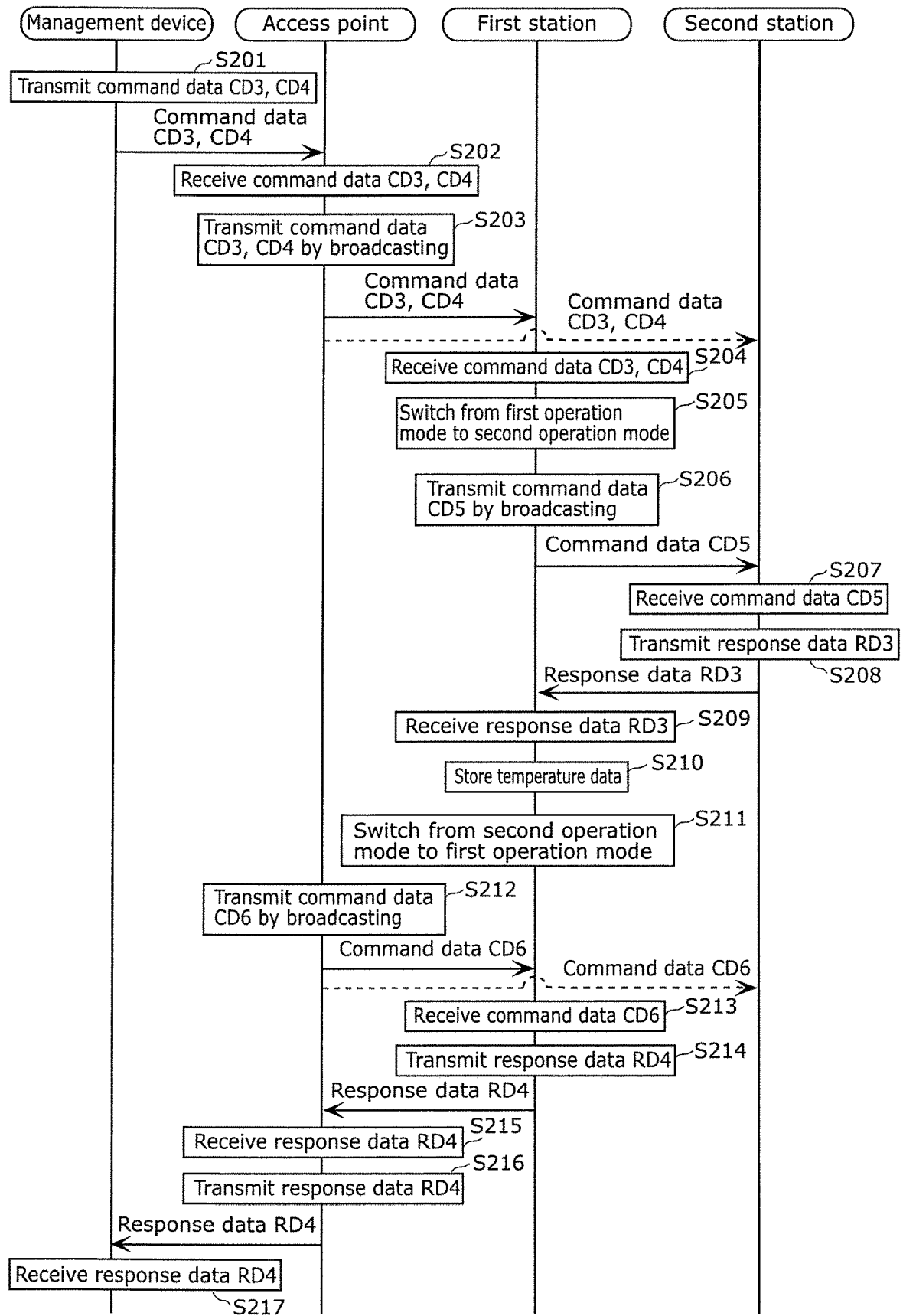
FIG. 10 is a sequence diagram illustrating the operation of a communication system according to an example when the communication between an access point and a second station is not in good condition.
Figure 11:
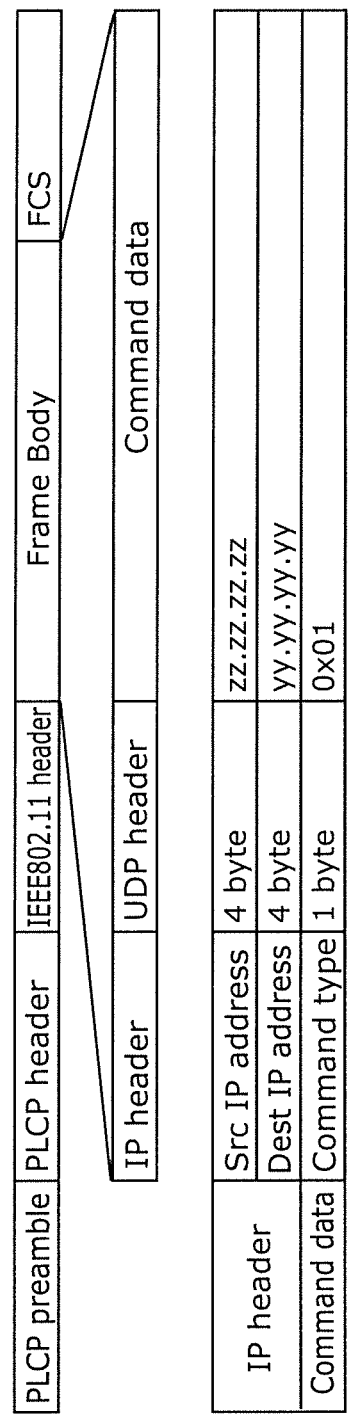
FIG. 11 is a diagram illustrating one example of command data transmitted from a management device to an access point.

FIG. 9 is a conceptual diagram illustrating the configuration of communication system 2 when the communication between access point 26 and second station 30 is not in good condition. FIG. 10 is a sequence diagram illustrating the operation of communication system 2 when the communication between access point 26 and second station 30 is not in good condition. FIG. 11 is a diagram illustrating one example of command data CD3 transmitted from management device 24 to access point 26. FIG. 12 is a diagram illustrating one example of response data RD4 transmitted from first station 28 to access point 26.

In the state illustrated in FIG. 9, since there is obstacle 54 between access point 26 and second station 30, second station 30 fails to receive the command data transmitted from access point 26 by broadcasting. Therefore, the response data from second station 30 is not returned to access point 26. On the other hand, access point 26 and first station 28 satisfactorily communicate with each other. In the operation example illustrated in FIG. 10, the operation mode of second station 30 is maintained to be the first mode.

Controller 37 of management device 24 determines that the communication between access point 26 and second station 30 is possible and generates command data CD3 (one example of the third signal) and command data CD4. Command data CD3 is for instructing first station 28 to switch the operation mode of first station 28 from the first operation mode to the second operation mode. In the example illustrated in FIG. 11, command data CD3 includes a) the source IP address of command data CD3, that is, IP address "zz.zz.zz.zz" of management device 24, b) the destination IP address of command data CD3, that is, temporary IP address "yy.yy.yy.yy" temporarily allocated by management device 24 to first station 28, and c) command type "0x01."

Command data CD4 is for requesting first station 28 to obtain the temperature data generated by each of first to fourth temperature sensors 20a to 20d in second station 30. Command data CD4 is equivalent to the result obtained by replacing the command type of command data CD1 illustrated in FIG. 7, for example, by "0x21."

As illustrated in FIG. 10, communicator 34 of management device 24 transmits command data CD3, CD4 to access point 26 (S201). Communicator 38 of access point 26 receives command data CD3, CD4 transmitted from management device 24 (S202).

Communicator 38 of access point 26 transmits, by broadcasting, command data CD3, CD4 that have been received (S203). Communicator 42 of first station 28 receives command data CD3, CD4 transmitted from access point 26 (S204).

Controller 46 of first station 28 switches the operation mode of first station 28 from the first operation mode to the second operation mode on the basis of received command data CD3 (S205). Accordingly, first station 28 operates as a proxy access point for access point 26. Furthermore, controller 46 of first station 28 generates command data CD5 (one example of the first signal) on the basis of received command data CD4.

Command data CD5 is for requesting second station 30 to transmit the temperature data generated by each of first to fourth temperature sensors 20a to 20d in second station 30. Command data CD5 is equivalent to the result obtained by replacing, in command data CD1 illustrated in FIG. 7, for example, a) the command type by "0x21," b) the MAC address by MAC address "xx:xx:xx:xx:xx:02" of second station 30, and c) the temporary IP address by temporary IP address "ww.ww.ww.ww" temporarily allocated by first station 28 to second station 30.

Communicator 42 of first station 28 transmits command data CD5 by broadcasting using, as the own IP address, temporary IP address "yy.yy.yy.yy" included in command data CD4 (S206). Communicator 48 of second station 30 receives command data CD5 transmitted from first station 28 (S207).

Controller 52 of second station 30 generates response data RD3 on the basis of received command data CD5. Response data RD3 is for responding to first station 28 with, for example, the temperature data generated by each of first to fourth temperature sensors 20a to 20d in second station 30. Response data RD3 is equivalent to the result obtained by replacing, in response data RD2 described above, a) the source IP address by "ww.ww.ww.ww," b) the destination IP address by "yy.yy.yy.yy" and c) the command type by "0x21."

Communicator 48 of second station 30 transmits response data RD3 to first station 28 using, as the own IP address, temporary IP address "ww.ww.ww.ww" included in command data CD5 (S208). Communicator 42 of first station 28 receives response data RD3 transmitted from second station 30 (S209).

Controller 46 of first station 28 causes storage 44 to store the temperature data and the like included in received response data RD3 (S210). Furthermore, controller 46 of first station 28 switches the operation mode of first station 28 from the second operation mode to the first operation mode with the reception of response data RD3 as an opportunity (S211). This allows first station 28 to operate as a station again.

Controller 41 of access point 26 generates command data CD6 (one example of the second signal) at the time at which the temperature data is desired to be obtained from second station 30. Command data CD6 is for requesting first station 28 to transmit the temperature data and the like obtained from second station 30 and stored into storage 44. Command data CD6 is equivalent to the result obtained by replacing the command type of command data CD1 illustrated in FIG. 7, for example, by "0x81."

Communicator 38 of access point 26 transmits command data CD6 by broadcasting (S212). Communicator 38 may transmit command data CD6 at a point in time after the temperature data and the like is stored into storage 44 in Step S210 and before the operation of first station 28 is switched in Step S211. Therefore, communicator 38 repeatedly transmits command data CD6 until response data RD4 (to be described later) from first station 28 is successfully received.

Communicator 42 of first station 28 receives command data CD6 transmitted from access point 26 (S213). Controller 46 of first station 28 generates response data RD4 on the basis of received command data CD6.

Response data RD4 is for responding to access point 26 with the temperature data and the like obtained from second station 30 and stored into storage 44. In the example illustrated in FIG. 12, response data RD4 includes a) the source IP address, that is, temporary IP address "yy.yy.yy.yy" of first station 28, b) the destination IP address, that is, IP address "zz.zz.zz.zz" of management device 24, c) command type "0x81," d) data length "20," e) position information "0001" indicating the position of first station 28, f) radio field strength "70 (−70 dbm)" between access point 26 and first station 28, g) position information "0002" indicating the position of second station 30, h) MAC address "xx:xx:xx:xx:xx:02" of second station 30, i) temporary IP address "ww.ww.ww.ww" temporarily allocated to second station 30, j) radio field strength "60 (−60 dbm)" between access point 26 and second station 30, and k) temperature data "60 (° C.)" generated by each of first to fourth temperature sensors 20a to 20d in second station 30.

Communicator 42 of first station 28 transmits response data RD4 to access point 26 using, as the own IP address, temporary IP address "yy.yy.yy.yy" included in command data CD6 (S214). Communicator 38 of access point 26 receives response data RD4 transmitted from first station 28 (S215) and transmits received response data RD4 to management device 24 (S216). Communicator 34 of management device 24 receives response data RD4 transmitted from access point 26 (S217). Accordingly, on the basis of received response data RD4, controller 37 of management device 24 updates the data about second station 30 in the management table stored into storage 36.

Command data CD6 is for requesting first station 28 to send the temperature data obtained from second station 30 stored into storage 44 and transmit the temperature data generated by each of first to fourth temperature sensors 20a to 20d in first station 28. In this example, response data RD4 further includes, for example, the radio field strength of the wireless communication between access point 26 and first station 28 and the temperature data generated by each of first to fourth temperature sensors 20a to 20d in first station 28.

4. Advantageous Effects

Next, advantageous effects obtained by communication system 2 will be described. As described above, when first station 28 operates as a proxy access point, first station 28 can obtain, from second station 30, the temperature data held by second station 30. Thus, for example, even when the communication between access point 26 and second station 30 is not in good condition, access point 26 can reliably obtain data from second station 30 via first station 28.

Furthermore, the temperature data included in response data RD3 transmitted from second station 30 is stored into storage 44 of first station 28. Therefore, at the time of transmission of command data CD6 from access point 26 to first station 28, it is possible to transmit the data stored into storage 44 from first station 28 to access point 26. This allows access point 26 to obtain the temperature data from second station 30 at desired time.

5. Variation

Figure 13:
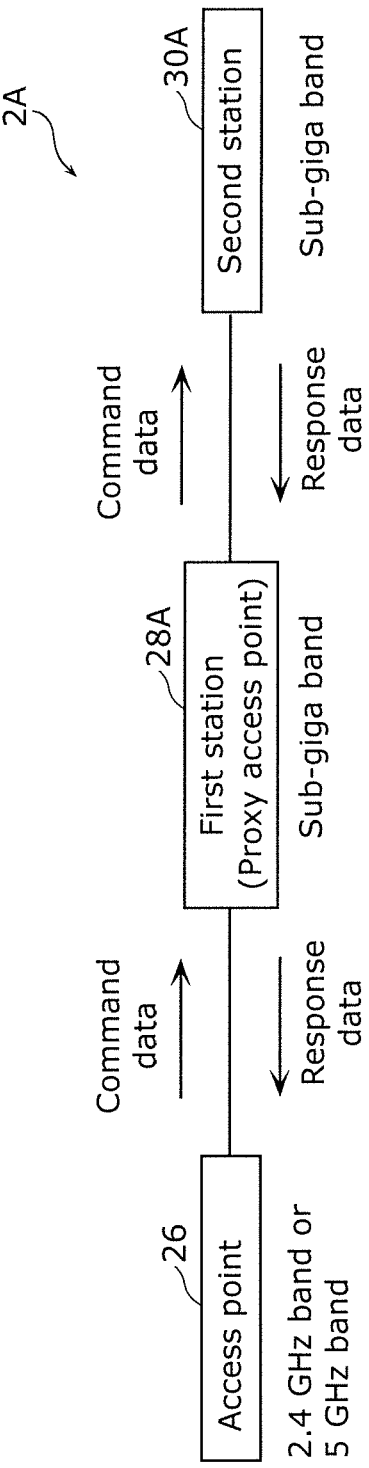
FIG. 13 is a block diagram illustrating the configuration of a communication system according to a variation of an example.

Next, with reference to FIG. 13, communication system 2A according to a variation of the example will be described. FIG. 13 is a block diagram illustrating the configuration of communication system 2A according to the variation of the example.

As illustrated in FIG. 13, in communication system 2A according to this variation, access point 26 supports WiFi communication in the 2.4 GHz or 5 GHz band, similar to the example. On the other hand, each of first station 28A and second station 30A supports WiFi communication in the sub-giga band (with a center wavelength of 920 MHz) compliant with IEEE 802.11ah.

Access point 26 converts the frame of command data using a frame structure suitable for the sub-giga band and transmits the command data having the converted frame to first station 28A. Upon operating as a proxy access point for access point 26, first station 28A transmits and receives command data and response data to and from second station 30A using the sub-giga band.

Other Variations

Although our communication methods and communication systems have been described thus far based on the example, this disclosure is not limited to the above-described example. Configurations resulting from various modifications of the above-described example that can be conceived by those skilled in the art as well as other configurations resulting from arbitrary combinations of structural elements in the above-described examples are included in this disclosure.

The above example describes when the communication between access point 26 and second station 30 is not in good condition, but this is not the only example. When the communication between access point 26 and first station 28 is not in good condition, it is sufficient that the operation mode of second station 30 be switched from the first operation mode to the second operation mode in the same manner as in Step S205 in FIG. 10 described above.

Although each of first station 28 and second station 30 includes first to fourth temperature sensors 20a to 20d in the above example, the sensors are not limited to these sensors; other various sensors may be included. Examples of such sensors include: a) a moisture sensor for use in a warehouse or the like that requires moisture management; b) an infrared sensor for use to detect, for example, the presence or absence of an item inside a factory upon storage and retrieval; c) a mechanical sensor that senses a state using a mechanical mechanism such as a load sensor; d) an electric current sensor for use for the purpose of overcurrent protection for a power module; and e) a flow sensor that senses a state on the basis of the amount of liquid such as oil or gas such as air for a machine tool. In other words, each of first station 28 and second station 30 may include at least one of the temperature sensor, the moisture sensor, the infrared sensor, the mechanical sensor, the electric current sensor, and the flow sensor, for example.

Although the wireless communication through the wireless LAN is used for the communication between first station 28 and second station 30 in the above example, the method of communication is not limited to this example. For example, wireless communication using Bluetooth (registered trademark) may also be used.

In the above example, when the communication between access point 26 and second station 30 becomes impossible, management device 24 transmits command data CD3, CD4 to access point 26, but the solution is not limited this example. For example, on the basis of the radio field strength between access point 26 and second station 30 that has been stored into the management table, controller 37 of management device 24 may predict that the communication between access point 26 and second station 30 will become impossible in the future. In this example, before the communication between access point 26 and second station 30 becomes impossible, management device 24 may transmit command data CD3, CD4 to access point 26.

Although command data CD1 and the like include the temporary IP addresses in the above example, such data are not limited to this example. A unique IP address may be assigned to each of first station 28 and second station 30 in advance.

Communication system 2 includes first station 28 and second station 30 in the above example, but may further include a third station. In this example, when the communication between access point 26 and each of second station 30 and the third station becomes impossible, first station 28 may obtain temperature data from each of second station 30 and the third station as a proxy access point for access point 26.

In the above example, upon an attempt to transmit command data to first station 28 and second station 30, controller 37 of management device 24 determines the state of communication on the basis of the presence or absence of the response data from first station 28 or second station 30, but such determination is not limited to this example. For example, controller 37 of management device 24 may determine the state of communication on the basis of whether the radio field strength in the communication between access point 26 and each of first station 28 and second station 30 is less than or equal to a threshold value (for example, −65 dbm) with reference to the management table. Thus, for example, when determining that the radio field strength in the communication between access point 26 and second station 30 is less than or equal to the threshold value, controller 37 of management device 24 transmits command data CD3, CD4 described above to access point 26.

In the above example, communication system 2 may include a plurality of stations including first station 28 and second station 30. When the communication between access point 26 and second station 30 is not in good condition, management device 24 may specify first station 28 located close to second station 30 among the plurality of stations on the basis of the position information of ST in the management table. Furthermore, management device 24 may transmit command data CD3, CD4 to access point 26.

INDUSTRIAL APPLICABILITY

Our communication system can be applied to a transport vehicle system or the like for transferring an article, for example, in an automated warehouse or the like, using a transport vehicle which travels along a rail installed on the ceiling.

The invention claimed is:

1. A communication method for use in a communication system including an access point, a first station, and a second station each of which is connected to a wireless network,
the first station being disposed on a first terminal block located at a joint between power supply lines and obtaining temperature data that is data indicating an internal temperature of the first terminal block, the power supply lines being installed along a rail to supply electricity to a transport vehicle traveling on the rail,
the second station being disposed on a second terminal block located at a joint between the power supply lines and obtaining temperature data that is data indicating an internal temperature of the second terminal block,
the method comprising:
(a) switching an operation mode of the first station from a first operation mode in which the first station operates as a slave station to a second operation mode in which the first station operates as a proxy master station;
(b) transmitting, from the first station operating in the second operation mode to the second station, a first signal that requests transmission of the temperature data held by the second station;
(c) transmitting the temperature data from the second station to the first station in response to the first signal;
(d) storing the temperature data received by the first station from the second station into a storage of the first station;
(e) switching the operation mode of the first station from the second operation mode to the first operation mode after the first station receives the temperature data from the second station;
(f) transmitting, from the access point to the first station, a second signal that requests transmission of the temperature data, after the temperature data is stored into the storage of the first station; and
(g) transmitting, from the first station operating in the first operation mode to the access point, the temperature data stored into the storage, in response to the second signal.

2. The method according to claim 1, further comprising:
(h) transmitting, from the access point to the first station, a third signal that instructs the first station to switch from the first operation mode to the second operation mode, depending on a state of communication between the access point and the second station,
wherein in (a), the operation mode of the first station is switched from the first operation mode to the second operation mode in response to the third signal.

3. The method according to claim 2, further comprising:
(i) determining whether a radio field strength in the communication between the access point and the second station is less than or equal to a threshold value,
wherein in (i), when the radio field strength is determined to be less than or equal to the threshold value, the access point transmits the third signal to the first station.

4. The method according to claim 1, wherein the second station includes a sensor, and the data includes data detected by the sensor in the second station.

5. The method according to claim 4, wherein the sensor includes at least one sensor selected from the group consisting of a temperature sensor, a moisture sensor, an infrared sensor, a mechanical sensor, an electric current sensor and a flow sensor.

6. A communication system comprising:
an access point connected to a wireless network;
a first station connected to the wireless network; and
a second station connected to the wireless network,
wherein the first station is disposed on a first terminal block located at a joint between power supply lines and obtains temperature data that is data indicating an internal temperature of the first terminal block, the power supply lines being installed along a rail to supply electricity to a transport vehicle traveling on the rail,
the second station is disposed on a second terminal block located at a joint between the power supply lines and obtains temperature data that is data indicating an internal temperature of the second terminal block,
the first station includes:
 a controller that switches an operation mode of the first station between a first operation mode in which the first station operates as a slave station and a second operation mode in which the first station operates as a proxy master station;
 a first communicator that, when the operation mode of the first station is switched from the first operation mode to the second operation mode, transmits a first signal that requests transmission of the temperature data held by the second station to the second station; and
 a storage that stores the temperature data transmitted from the second station,
the second station includes:
 a second communicator that transmits the temperature data to the first station in response to the first signal transmitted from the first station,
the access point includes:
 a third communicator that transmits a second signal that requests transmission of the temperature data to the first station after the temperature data is stored into the storage of the first station, and
 after the operation mode of the first station is switched from the second operation mode to the first operation mode, the first communicator of the first station transmits the temperature data stored into the storage to the access point in response to the second signal transmitted from the access point.

* * * * *